US005865379A

United States Patent [19]

Dahl

[11] Patent Number: 5,865,379
[45] Date of Patent: Feb. 2, 1999

[54] ISOLATOR FOR DEPENDING COMPONENTS ON ELECTROSTATIC FIELD SPRAYER BOOM

[75] Inventor: Jeffrey A. Dahl, Lincoln, N. Dak.

[73] Assignee: AGCO Corporation, Duluth, Ga.

[21] Appl. No.: 854,965

[22] Filed: May 12, 1997

[51] Int. Cl.[6] .......... B05B 1/20; B05B 5/00

[52] U.S. Cl. .......... 239/690; 239/146; 239/159; 239/172; 239/695; 239/708

[58] Field of Search .......... 239/690, 691, 239/695, 696, 708, 146, 147, 159, 163, 172

[56] References Cited

U.S. PATENT DOCUMENTS

| | | | |
|---|---|---|---|
| 3,147,145 | 9/1964 | Simmons | 239/695 X |
| 3,257,989 | 6/1966 | Webb | 118/305 |
| 3,584,788 | 6/1971 | Lloyd | 239/172 |
| 4,360,155 | 11/1982 | Hubbelll et al. | 239/3 |
| 4,440,349 | 4/1984 | Sickles et al. | 239/698 |
| 4,650,124 | 3/1987 | Connaughty et al. | 239/708 |
| 4,679,735 | 7/1987 | Pay | 239/708 |
| 4,760,965 | 8/1988 | Schneider | 239/701 |
| 4,788,617 | 11/1988 | Davidson | 361/1 |
| 4,846,407 | 7/1989 | Coffee et al. | 239/690 |
| 4,865,257 | 9/1989 | Bailey | 239/288.5 |
| 4,962,885 | 10/1990 | Coffee | 239/3 |
| 4,986,473 | 1/1991 | Semple et al. | 239/104 |
| 5,031,834 | 7/1991 | Simpson | 239/172 |
| 5,402,945 | 4/1995 | Swanson, Jr. | 239/172 X |
| 5,636,799 | 6/1997 | Trusty et al. | 239/708 |
| 5,647,542 | 7/1997 | Diana | 239/695 X |
| 5,660,334 | 8/1997 | Trusty et al. | 239/691 |

*Primary Examiner*—Andres Kashnikow
*Assistant Examiner*—Robin O. Evans
*Attorney, Agent, or Firm*—Westman, Champlin & Kelly, P.A.

[57] ABSTRACT

An isolator system for an attachment to an electrostatic field sprayer discharging liquids having an electrostatic potential thereon comprising a series of spaced apart flat discs that shed water in both directions, and which are made of an insulating material and mounted concentrically on the attachment. The attachment has a length that extends substantially vertically downward, and said discs are spaced apart in vertical direction. The discs are graduated in size with the smallest disc on the bottom, and any discs above the bottom disc are of larger diameter than the next adjacent lower disc.

10 Claims, 3 Drawing Sheets

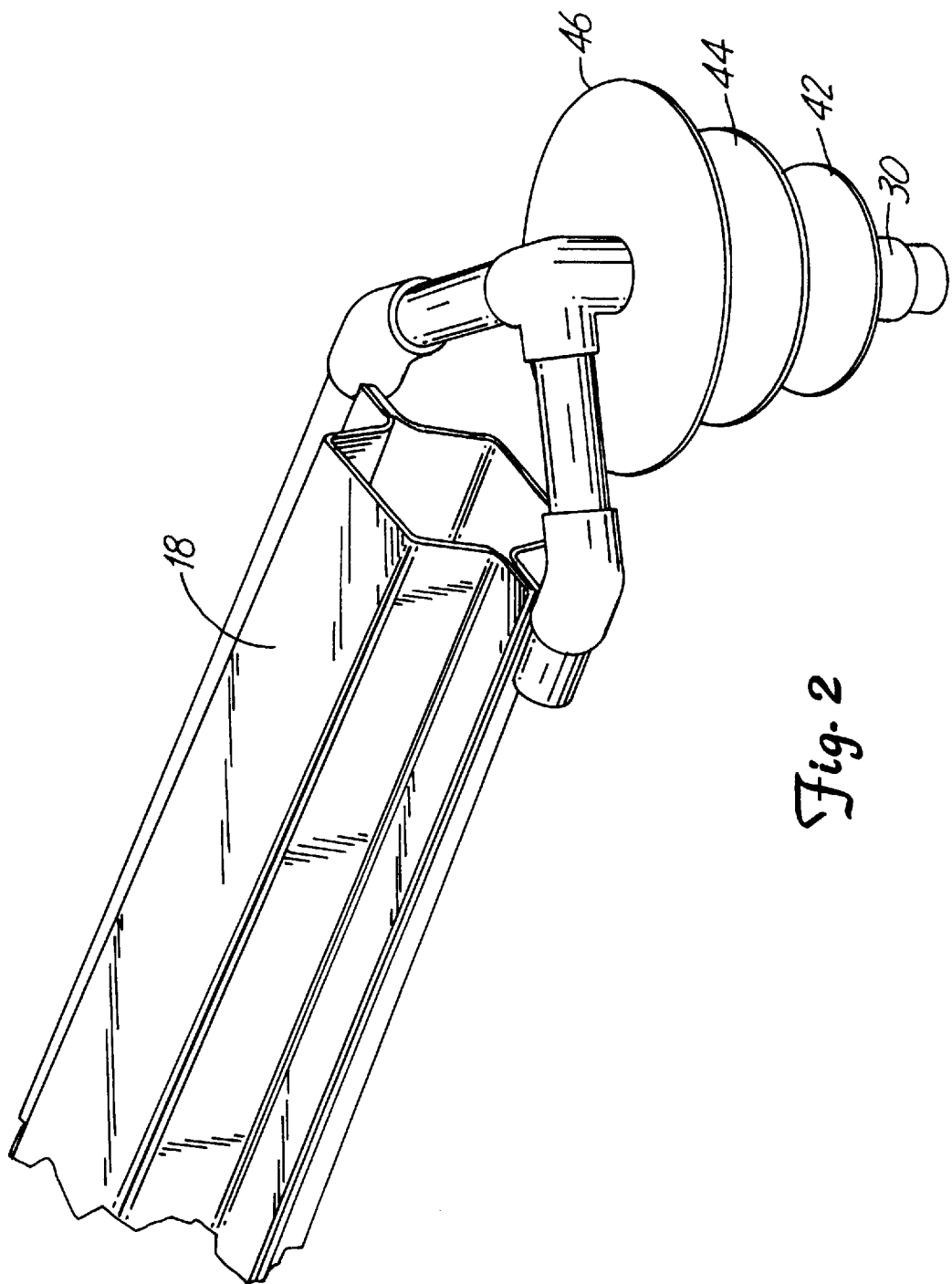

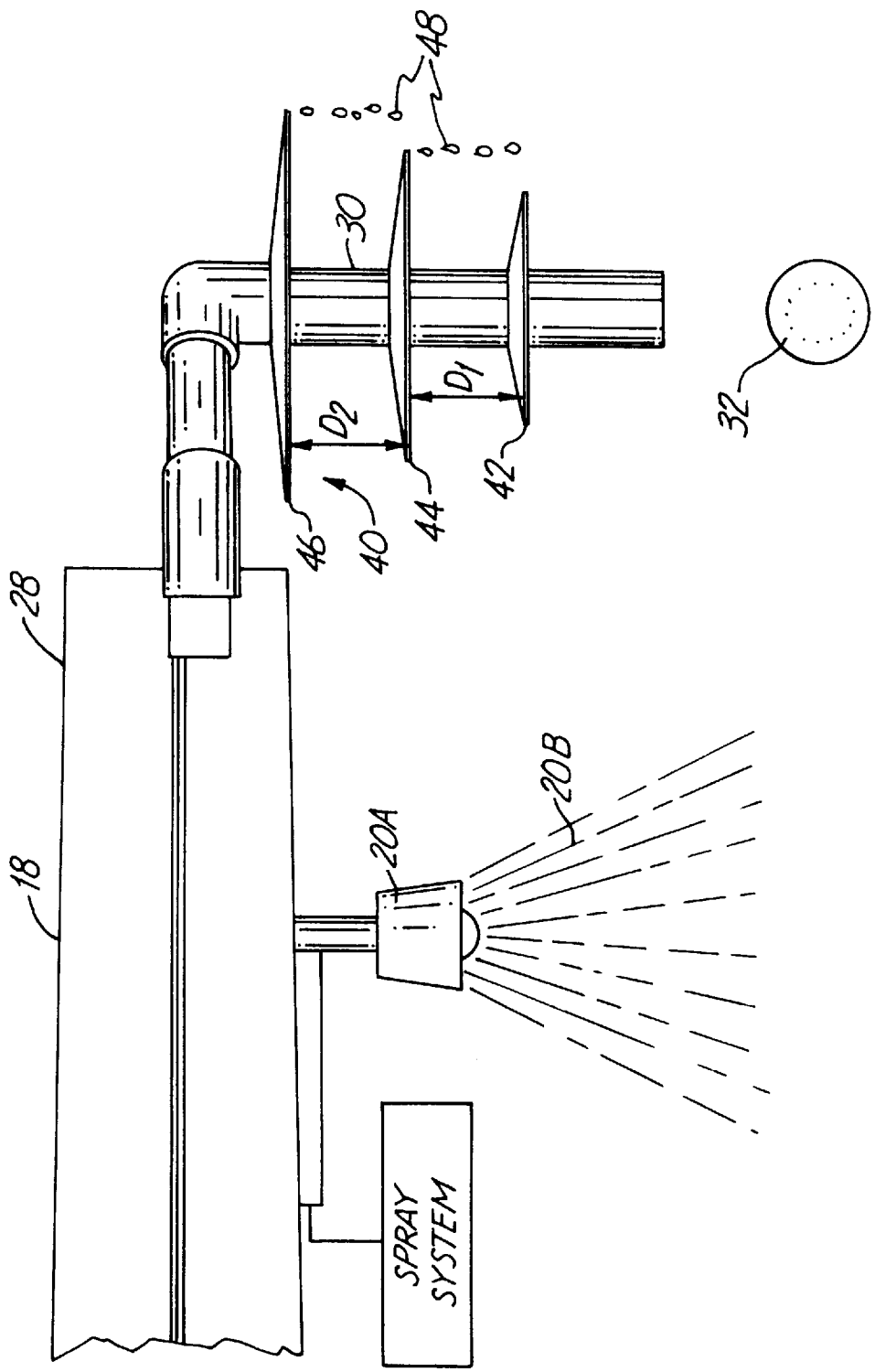

ISOLATOR FOR DEPENDING COMPONENTS ON ELECTROSTATIC FIELD SPRAYER BOOM

BACKGROUND OF THE INVENTION

The present invention relates to a system for electrically isolating a depending member on a field sprayer boom by providing a barrier for migration of charged particles toward a grounded potential portion of the field sprayer. In particular, the isolator is used in connection with a depending foam marker pipe at the outer ends of the boom for marking the path for travel of the sprayer.

Electrostatic field sprayers are known, and for example are shown in U.S. Pat. No. 4,788,617 to Davidson. Such electrostatic sprayers can be utilized for applying herbicides or pesticides, and aid in increasing sprayer efficiency.

Further, U.S. patent application Ser. No. 08/372,377, now U.S. Pat. No. 5,636,799 filed Jan. 13, 1995 owned by the same assignee as this application, illustrates a typical field sprayer using electrostatic principles for applying liquids. The present invention can be adapted for use on such a field sprayer.

In conduction electrostatic spraying, a very high potential liquid is sprayed from nozzles spaced along a boom, and the liquid spray drops are charged to in the range of 40,000 volts or more. The boom and the accessories are maintained at substantially ground potential, so the liquid particles are attracted to the lower voltage components. The accumulated droplets form paths for shorting out the high voltage charge.

Atmospheric conditions may also cause condensation of water or the formation of dew on the sprayer boom and other components, particularly during use in the early morning or evening. This moisture may also cause shorting out of the high voltage system.

Various types of shields have been advanced for preventing migration of electrostatically sprayed liquids to a grounded component. The problems persist particularly where a folding boom is utilized, as is the case with the large field sprayers. Inverted cup isolators that have been advanced serve as isolators in working position, but when they are on an outer end of the boom and the boom is folded back on itself, the cups open upwardly and collect water, which then serves to provide a wet path for voltage leakage as soon as the boom is returned to its usable extended position.

The foam used for foam markers is at substantially ground potential. The insulating pipes that carry the foam are connected to grounded components, so it is important to prevent any conductive paths from being formed on the pipe. The foam is generally dropped adjacent to the outer spray nozzles, so it tends to become wetted with electrostatically charged particles and these tend to migrate back to the supports for the depending pipes carrying the foam.

The one mode of failure is that the current may penetrate the material of the foam tubes and reach the foam (which is a conductor) and then reach the foam source via the foam in the remainder of the tube. This is prevented by the dielectric properties of the material used for the tube. Current may also travel along the foam tube (after it has been wetted by the above mentioned reasons) and reach the foam outlet. As soon as the current reaches the foam outlet, it will be conducted back to "ground" because of the conductive nature of the water based foam. This is prevented by the isolator discs of the present invention.

SUMMARY OF THE INVENTION

The present invention relates to an isolator assembly primarily for use with foam markers on electrostatic field sprayer booms, but which also can be utilized for disrupting paths of migration of charged liquid toward grounded components on booms, pipes or supports that are utilized with sprayer booms.

The isolator comprises at least on disc, but preferably a plurality of discs, preferably of different size gradations with the smaller discs most closely adjacent to the charged liquid that is to be isolated. The flat discs used, when placed in series, are open to the atmosphere and spaced apart. The spacing permits airflow that promotes drying of any liquid that may be migrating along the surfaces. Essentially the discs form a cumulative air gap for providing electrical isolation and reducing or preventing migration of charged particles along a non conductive or grounded support component.

In the form shown, the different diameters of the discs lets water drip free from the upper discs without hitting the lower discs, when the discs are mounted on a vertical pipe. While single discs will work, multiple discs provide better isolation.

The isolator also protects the high voltage system in the presence of dew on the foam delivery tubes by encouraging water to drip off and by promoting air circulation.

BRIEF DESCRIPTION OF THE DRAWINGS

FIG. 2 is an enlarged perspective view of an end of the boom showing a foam marker drop pipe with the isolation discs made according to the present invention installed thereon; and FIG. 3 is a side elevational view of the device of FIG. 2.

DETAILED DESCRIPTION OF THE PREFERRED EMBODIMENTS

Figure 1:
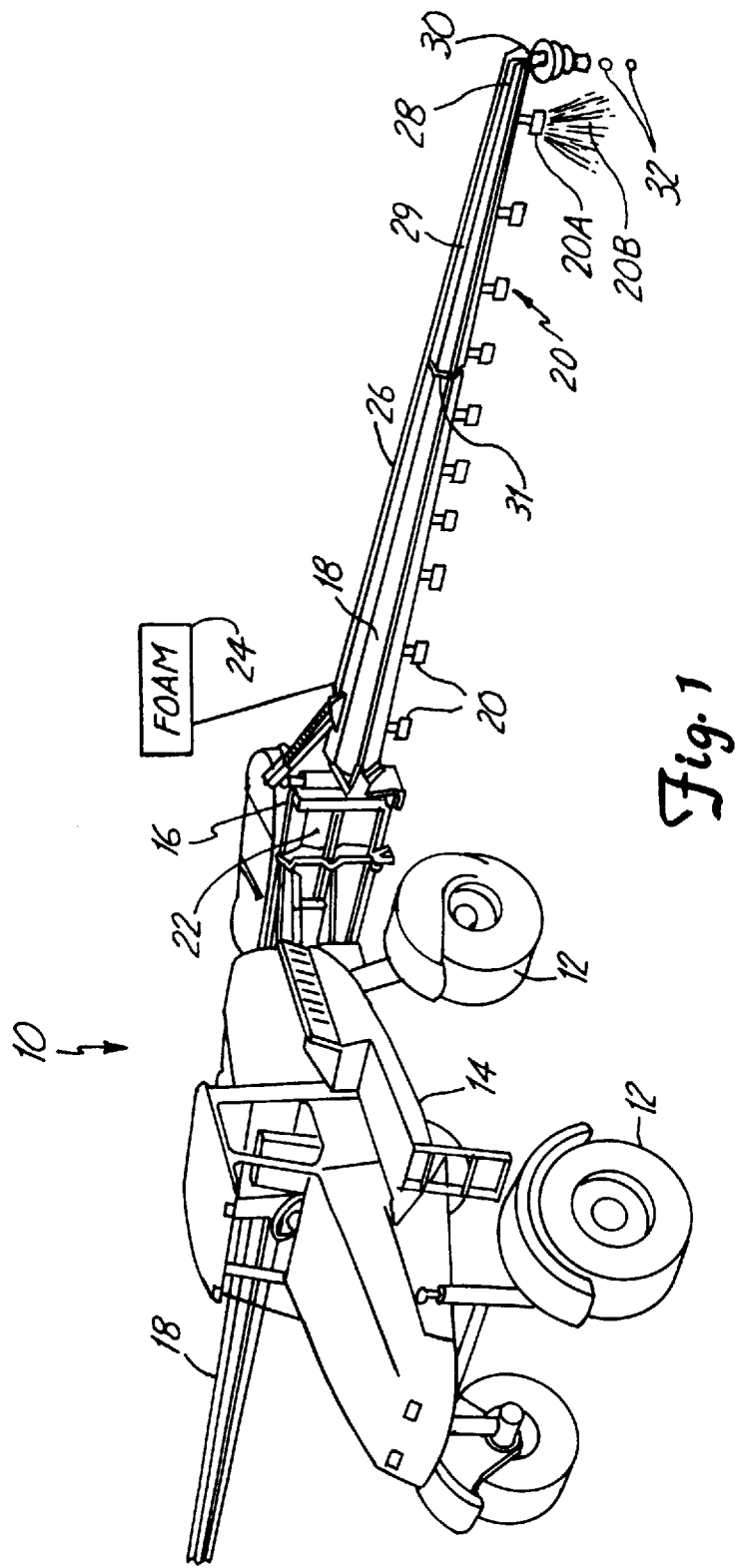
FIG. 1 is a schematic perspective view of a typical field sprayer having a component using isolation discs made according to the present invention.

Referring to FIG. 1, a self-propelled field sprayer indicated generally at 10 has suitable support wheels 12 for traveling over the ground, which are mounted a main frame assembly 14. A sprayer frame 16 is mounted at the back of the main frame 14 on suitable supports, and has laterally extending elongated booms 18 mounted thereon.

In this showing, the booms 18 are made of an insulating material, such as fiberglass, and are made to support a plurality of spray nozzles shown schematically at 20 for illustrative purposes only, and not to represent the true spacing of such spray nozzles. The frame 16 carries an electrostatic sprayer assembly indicated generally at 22 that provides a charge onto a liquid that is to be sprayed from the nozzle 20. The long booms 18 are used with a foam marker system that is well known, and pipes carry a wet foam from a foam source 24 through insulating, plastic pipe 26 to an outer end portion 28 of the boom 18 where the pipe is joined to a depending pipe section 30. The pipe 26 is suitably supported on the boom, in a convention manner.

The electrostatic sprayer can be of any desired type, which places a high voltage charge on the liquid that is discharged from the spray nozzles.

The foam source 24 ejects foam along the pipe 26 and out through the vertical pipe section 30 in large drops shown at 32. The foam is at ground potential. The spray nozzle 20A shown adjacent the outer end 28 of the boom, sprays a pattern illustrated generally at 20B, so that the electrostatically charged particles in the pattern 20B will tend to be attracted to the foam drop 32 as they fall to the ground. This tends to carry over spray onto the outside of the insulation depending pipe 30, and when it becomes moist with the liquid from the spray a path is formed for electrical current to flow through the foam back to the foam source 24, which is also grounded. Also high humidity and dew tend to form current paths on the exterior of components back to ground. Current leakage reduces the efficiency of the sprayer.

In order to isolate the depending pipe 30, an isolator section indicated generally at 40 is provided, which comprises at least one generally flat disc 42, and preferably additional flat discs 44 and 46, as shown. In the form shown, the disc 42, which is the lowest disc is smaller diameter than the disc 44, and the disc 44 is of smaller diameter than disc 46 by a sufficient amount so that liquid dropping off the edge of the disc 46 will miss the disc 44 and liquid dropping of disc 44 or 46 will miss the lowest disc 42. This liquid is shown schematically at 48 for purposes of illustration.

The discs 42 and 44 are vertically spaced a distance $D_1$ that is sufficient to provide adequate air circulation and a distance along the vertical pipe section 30 that provides an air gap for isolation. Likewise, the disc 46 and 44 are separated by the distance $D_2$ and distance $D_2$ is again selected to provide for adequate air flow between the adjacent discs as well as a distance along the vertical type 30 that will provide an adequate air gap for discouraging migration or travel of liquid vertically upward.

As can be seen, the discs 42, 44 and 46 are slightly crowned on the upper side, which is preferably made by thickening the material from which the discs are formed at the center so that the bottom side of the disc is flat and will not collect rain, dew or other liquid when the boom section at the outer end indicated at 29 is folded about a general fold axis 31 back toward the base portion of the boom 18 and the frame 16.

The discs are made of an insulating material, such as a suitable plastic as well. The mist or spray shown at 20B is at essentially 40,000 volts or more, and thus the mist is attracted to the foam drop 32 that will drop along the ground to provide a mark for the next pass of the sprayer, as well as any liquid, including dew, that may be clinging to the insulated pipe 30 or the feed pipe 26 as well as to the boom assembly 18.

Flat discs also are useful as isolators when positioned with their planes vertically on a boom such as boom 18, and when used in series they have advantage over cup shaped isolators that they do not collect water, either dew or rain water, and have air movement between them for drying. This is particularly true in a mobile machine such as that shown at 10, because as the machine is moving air will pass between the discs.

It should be noted that in the prior art, inverted cups have been used, but again have the short comings discussed.

Although the present invention has been described with reference to preferred embodiments, workers skilled in the art will recognize that changes may be made in form and detail without departing from the spirit and scope of the invention.

What is claimed is:

1. A mobile field spraying apparatus comprising:

an elongated boom extending laterally from a prime mover;

an electrostatic spray assembly including nozzles mounted on said boom for discharging liquid at an electrical potential substantially higher than that of the boom;

a conduit mounted on said boom for carrying materials to a remote end of the boom; and an isolator mounted on said conduit comprising a plurality of open discs having a pair of opposite facing surfaces supported on the tube and spaced along an axial length of the tube, said discs being substantially flat without concavities on the oppositely facing surfaces.

2. The apparatus of claim 1, wherein said conduit has a vertical section, and said discs are mounted on said vertical section and are vertically spaced apart.

3. The apparatus of claim 2, wherein said discs include first and second discs, the first disc being lower than the second disc and of a smaller diameter than the second disc such that liquid dripping off the second disc does not fall on the first disc.

4. The apparatus of claim 3, wherein the conduit comprises an insulated tube carrying a foam material at substantially ground potential.

5. The apparatus of claim 3, wherein there are three discs on said vertical section, and the upper disc comprises a third disc and is of larger diameter than the first and second discs.

6. The apparatus of claim 5, wherein said discs are positioned to be unobstructed such that movement of a prime mover supporting the apparatus causes air flow to occur across the discs.

7. In a spraying apparatus comprising an electrostatic sprayer having discharge nozzles thereon discharging an electrically charged liquid, and an accessory conduit carrying a material that is at substantially ground potential to be discharged adjacent to one of the nozzles, the improvement comprising an isolator to reduce the conduction of electrical current toward a ground potential comprising at least one generally flat disc mounted on said accessory conduit and extending laterally outwardly therefrom around a central axis.

8. The improvement of claim 7, wherein the accessory conduit comprises a vertically extending tube, and a plurality of discs are provided and are spaced axially along the conduit, a disc which forms a bottom disc being smaller than other discs.

9. A spray apparatus for spraying a liquid comprising:

a spray nozzle for directing a pressurized spray of liquid carrying an electrical potential;

a boom supporting said spray nozzle;

an auxiliary marker system including marking materials discharged from a pipe, said pipe having a downwardly inclined portion, and a series of isolation discs on said downwardly inclined portion comprising at least first and second flat discs that are spaced apart along an axial length of said downwardly inclined portion, the discs being made of electrically insulating material, and an upper of said discs being of said larger size than a lower of said discs.

10. The apparatus of claim 7 and a third disc spaced upwardly from the upper of the discs and being of larger size than of said upper disc.

* * * * *